3,274,010
CERAMIC ADHESIVE COMPOSITION
Orval G. Caldwell, Los Angeles, Calif., assignor, by mesne assignments, to the United States of America as represented by the Secretary of the Navy
No Drawing. Filed Feb. 18, 1963, Ser. No. 259,466
1 Claim. (Cl. 106—71)

This invention relates to a ceramic adhesive composition for joining together layers of dense either high or low porosity ceramic materials.

Innumerable methods have been investigated and applied in producing ceramic adhesion between dense and relatively low porosity ceramic surfaces, many of which had highly refractory properties. The adhesion of highly porous refractory sheets to one another is difficult to achieve without causing penetration of the adhesive into the pores thereby resulting in a decrease in the degree of porosity of the resultant lamina. Another problem with the prior art methods was that because of the nature of the adhesive compounds employed, the adhesion had to be accomplished at such a high temperature thereby causing a distortion of the highly refractory sheets. For example, adhesives made of either sodium silicate and various grogs or refractory clay and grog mixtures or compositions made from mixtures of calcium-aluminates and phosphates or magnesium oxychloride, all require such extremely high temperatures in order to provide high strength adhesion between the porous sheets that the sheets tend to plasticize to the surfaces of the porous sheets which causes a loss in the degree of porosity of the resultant layers.

I have discovered that greatly improved laminates of porous ceramic layers, which maintain a high degree of porosity with as many as six layers encompassing four levels of porosity, can be prepared from refractory materials and a binder consisting essentially of a syenite and a talc, and I have also discovered that such laminates demonstrate excellent adhesive qualities between thin sheets of dense, non-porous high purity refractory oxides as well as between thin sheets of dense highly porous refractory oxides with no loss in the degree of porosity.

It is, therefore, an object of this invention to provide refractory laminates possessing these very desirable properties and a process for making them.

Another object of this invention is to provide a method for binding highly porous thin refractory sheets together to form a porous laminate without penetration of the adhesive into the sheets to a degree causing appreciable contamination or filling of the pores in the laminate.

Yet another object of this invention is to provide a method for forming highly porous refractory laminates at a temperature which provides considerable refractoriness in the final product without causing distortion of the highly refractory sheets.

Other objects and many of the attendant advantages of this invention will be readily appreciated as the same becomes better understood by reference to the following detailed description.

The present invention consists of an adhesive composition and a method for applying it to the surfaces of their porous refractory oxide sheets thereby enabling the sheets to be joined together to form a high porosity laminate. The adhesive may be formed by combining these components within the following approximate percentages by weight:

| | Percentages |
|---|---|
| A fine grained syenite | 70–90 |
| A fine grained, carbonate free talc | 10–30 |
| Bentonitic type clay | 2–6 |

The adhesive composition may be prepared by suspending the ingredients in the proportions specified, and while it is generally preferred that the ingredients be mixed with or dispersed in approximately 60–95% by weight of water to form a slurry or suspension, it has been found that a suspension containing up to about 42% solids provides sufficient water to form a workable or sprayable slurry of the adhesive composition. The quantity of bentonitic type clay added is dependent on the spraying consistency desired, but within the range of two to six percent.

The bentonitic type clay functions as a suspending agent to assist in maintaining the syenite and talc in suspension thereby providing a homogeneous spray mixture.

The following analysis on a dry weight basis is typical of a type of bentonitic clay that performs satisfactorily in the adhesive composition.

| | Percentages |
|---|---|
| $SiO_2$ | 55.44 |
| $Al_2O_3$ | 20.14 |
| $Fe_2O_3$ | 3.67 |
| FeO | 0.30 |
| MgO | 2.49 |
| CaO | 0.50 |
| $K_2O$ | 0.60 |
| $Na_2O$ | 2.75 |
| $TiO_2$ | 0.10 |
| Ignition loss | 14.70 |

A typical nepheline syenite has a chemical composition consisting essentially of the following metal oxides on a dry weight basis:

| | Percentages |
|---|---|
| $SiO_2$ | 60.8 |
| $Al_2O_3$ | 23.3 |
| $Fe_2O_3$ | 0.07 |
| CaO | 0.6 |
| MgO | 0.1 |
| $Na_2O$ | 10.0 |
| $K_2O$ | 4.5 |
| Ignition loss | 0.6 |

The chemical analyses of a typical talc yielded the following constituents on a dry weight basis:

| | Percentages |
|---|---|
| $SiO_2$ | 61.90 |
| $Al_2O_3$ | 0.59 |
| $Fe_2O_3$ | 0.56 |
| CaO | 0.17 |
| MgO | 30.41 |
| $Na_2O$, $K_2O$ | 0.16 |
| Ignition loss | 5.38 |

The adhesive mixture is sprayed onto the respective adhesion faces of thin porous refractory oxide sheets which are then positioned together to form a laminate. The sheets are held in place by any suitable weight. Subsequent to this step, the laminate is placed into a furnace and fired to 1136–1436° C. (2075–2624° F.) on a steadily increasing temperature rise over six hours. Upon its removal from the kiln, the laminate exhibits excellent adhesive qualities without causing distortion of the highly refractory sheets or causing appreciable filling of the pores in the sheets.

It will be understood that the details given are for the purpose of illustration, not restriction, and that variations within the spirit of the invention are intended to be included in the scope of the appended claim.

What I claim is:

An adhesive composition for forming laminates of thin porous highly refractory sheets comprising an aqueous slurry consisting essentially of approximately 60 to 95% by weight of water and the following ingredients in the approximate percentages by dry weight indicated:
(a) 2–6 of bentonitic clay,
(b) 70–90 of a compound consisting of 60.8 $SiO_2$, 23.3 $Al_2O_3$, 0.07 $Fe_2O_3$, 0.6 CaO, 0.1 MgO, 10.0 $Na_2O$, 4.5 $K_2O$ and 0.6 ignition loss said compound being known as a fine grained syenite and
(c) 10–30 of a compound consisting of 61.90 $SiO_2$, 0.59 $Al_2O_3$, 0.56 $Fe_2O_3$, 0.17 CaO, 30.41 MgO, 0.16 $Na_2O$ and $K_2O$ and 5.38 ignition loss said compound being known as a fine grained, carbonate free talc.

References Cited by the Examiner

UNITED STATES PATENTS

| | | | |
|---|---|---|---|
| 944,436 | 12/1909 | Higgins et al. | 106—71 |
| 1,927,894 | 9/1933 | Krause | 156—89 |
| 2,485,724 | 10/1949 | Ford | 156—89 |
| 3,090,094 | 5/1963 | Schwartzwalder et al. | 156—89 |
| 3,093,593 | 6/1963 | Arrance | 106—62 |

EARL M. BERGERT, *Primary Examiner.*

H. F. EPSTEIN, *Assistant Examiner.*